US012700767B2

(12) United States Patent
Fischer et al.

(10) Patent No.: US 12,700,767 B2
(45) Date of Patent: Aug. 4, 2026

(54) ELECTRIC MACHINE

(71) Applicant: Schaeffler Technologies AG & Co. KG, Herzogenaurach (DE)

(72) Inventors: Alexandre Fischer, Strasbourg (FR); Tim Schmid, Malsch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 212 days.

(21) Appl. No.: 18/691,242

(22) PCT Filed: Sep. 2, 2022

(86) PCT No.: PCT/DE2022/100651
§ 371 (c)(1),
(2) Date: Mar. 12, 2024

(87) PCT Pub. No.: WO2023/046231
PCT Pub. Date: Mar. 30, 2023

(65) Prior Publication Data
US 2024/0380272 A1     Nov. 14, 2024

(30) Foreign Application Priority Data

Sep. 21, 2021    (DE) ..................... 10 2021 124 347.5

(51) Int. Cl.
H02K 5/15          (2006.01)
(52) U.S. Cl.
CPC ..................................... H02K 5/15 (2013.01)
(58) Field of Classification Search
CPC ........................................................ H02K 5/15
USPC ........................................................ 310/400
See application file for complete search history.

(56) References Cited

FOREIGN PATENT DOCUMENTS

| | | |
|---|---|---|
| DE | 844616 C | 7/1952 |
| DE | 2124929 A1 | 11/1972 |
| DE | 2845668 A1 | 4/1980 |
| DE | 2845663 A1 | 5/1980 |
| DE | 3635987 C2 | 9/1989 |
| DE | 20100029 U1 | 11/2001 |

(Continued)

OTHER PUBLICATIONS

German automotive magazine ATZ, vol. 113, May 2011, pp. 360-365 by Erik Schneider, Frank Fickl, Bernd Cebulski and Jens Liebold with the title: "Hochintegrativ und flexibel—Elektrische Antriebseinheit für E-Fahrzeuge" [Highly Integrative and Flexible—Electric Drive Unit for Electric Vehicles], Jan. 2011.

*Primary Examiner* — Jose A Gonzalez Quinones
(74) *Attorney, Agent, or Firm* — Volpe Koenig

(57) ABSTRACT

An electric machine, having a stator and a rotor arranged rotatably in the stator (3), and an end shield arranged non-rotatably with respect to the stator for mounting the rotor therein. The end shield extends at least partially along a radial plane orthogonal to the rotor axis of rotation. The stator is connected to a stator support which extends orthogonal to the axis. The end shield and the stator support have a centering arrangement for centering the end shield with respect to the stator support, which has an annular opening having a radially inner peripheral surface designed as a centering seat, and is abutted by at least three centering studs projecting axially from the end shield. The centering studs are configured to form with the inner peripheral surface the centering arrangement for centering the end shield with respect to the stator support.

20 Claims, 5 Drawing Sheets

(56)         References Cited

FOREIGN PATENT DOCUMENTS

| | | | | | |
|---|---|---|---|---|---|
| DE | 102014218034 | A1 | | 4/2015 | |
| DE | 102014217129 | A1 | | 3/2016 | |
| DE | 102018215804 | A1 | * | 3/2020 | ........... H02K 1/2733 |
| DE | 102018128937 | A1 | * | 5/2020 | ............ H02K 5/203 |
| WO | 2013098092 | A1 | | 7/2013 | |

* cited by examiner

ELECTRIC MACHINE

CROSS-REFERENCE TO RELATED APPLICATIONS

This application is the U.S. National Phase of PCT Appln. No. PCT/DE2022/100651, filed Sep. 2, 2022, which claims priority to German Patent Ap-plication No. 10 2021 124 347.5, filed Sep. 21, 2021, the entire disclosures of which are incorporated by reference herein.

TECHNICAL FIELD

The present disclosure relates to an electric machine, in particular for use within a drive train of a hybrid or fully electrically driven motor vehicle, comprising a stator and a rotor arranged rotatably in the stator, wherein the electric machine has an end shield arranged in a non-rotatable manner with respect to the stator for mounting the rotor with respect to the stator, wherein the end shield extends at least in sections along a radial plane which is substantially orthogonal to the axis of rotation of the rotor, wherein the stator is connected in a non-rotatable manner to a stator carrier which also extends at least in sections along a radial plane which is substantially orthogonal to the axis of rotation of the rotor, wherein the end shield and the stator carrier have centering means for centering the end shield with respect to the stator carrier.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the German automotive magazine ATZ, volume 113, 05/2011, pages 360-365 by Erik Schneider, Frank Fickl, Bernd Cebulski and Jens Liebold with the title: "Hochinte-grativ und flexibel—Elektrische Antriebseinheit für E-Fahrzeuge" [Highly Integrative and Flexible—Electric Drive Unit for Electric Vehicles], which is probably the closest prior art. This article describes a drive unit for an axle of a vehicle, which comprises an electric motor that is arranged to be concentric and coaxial with a bevel gear differential, wherein a shiftable 2-speed planetary gear set is arranged in the power train between the electric motor and the bevel gear differential and is also positioned to be coaxial with the electric motor or the bevel gear differential or spur gear differential. The drive unit is very compact and allows for a good compromise between climbing ability, acceleration and energy consumption due to the shiftable 2-speed planetary gear set. Such drive units are also referred to as e-axles or electrically operable drive trains.

In addition to fully electric drive concepts, so-called hybrid drives are also known. A drive train of a hybrid vehicle comprises a combination of an internal combustion engine and an electric motor and enables—for example in urban areas—a purely electric mode of operation with sufficient range and availability, in particular when driving cross-country. In addition, there is the possibility of driving the internal combustion engine and the electric motor at the same time in certain operating situations.

The noise generated by the drive and its weight play an important role, particularly in the case of such hybrid or fully electric drive concepts. However, these two require-ments are contradictory, wherein better noise insulation of the drive usually also results in a higher weight. High electromagnetic excitation can occur for system-related rea-sons during operation of such an electric machine for a hybrid or fully electric drive train, which can also lead to acoustic vibrations in the structural components of the electric machine or drive train. This can then also be audible in the interior of the vehicle, which is regularly perceived as intrusive.

SUMMARY

It is therefore the object of the disclosure to provide an electric machine, in particular for use within a drive train of a hybrid or fully electrically driven motor vehicle, which is optimized with regard to its smooth operation.

This object is achieved by an electric machine, in par-ticular for use within a drive train of a hybrid or fully electrically driven motor vehicle, comprising a stator and a rotor arranged rotatably in the stator, wherein the electric machine has an end shield arranged in a non-rotatable manner with respect to the stator for mounting the rotor with respect to the stator, wherein the end shield extends at least in sections along a radial plane which is substantially orthogonal to the axis of rotation of the rotor, wherein the stator is connected in a non-rotatable manner to a stator carrier which also extends at least in sections along a radial plane which is substantially orthogonal to the axis of rota-tion of the rotor, wherein the end shield and the stator carrier have centering means for centering the end shield with respect to the stator carrier, wherein the stator carrier has an annular opening on its radial plane which is substantially orthogonal to the axis of rotation of the rotor, having a radially inner lateral surface formed as a centering seat, against which surface at least three centering studs project-ing axially from the radial plane of the end shield, which is substantially orthogonal to the axis of rotation of the rotor, bear and are configured in such a way that the centering studs form the centering means for centering the end shield with respect to the stator carrier with the inner lateral surface.

By way of extensive research, the applicant was able to show that the acoustically effective vibrations, which are perceived as particularly intrusive, are mainly caused by the vibrations of the end shields of the electric machine. The electromagnetic forces acting on the stator teeth during operation of the electric machine can cause the end shield(s) to be excited to vibrate indirectly, for example via a stator carrier. This leads to the acoustic abnormalities outlined above and to the introduction of vibrations into the housing structure of the electric machine or the surrounding compo-nent structures, such as a transmission housing. Intensive modeling, simulations and measurements have shown that, in the event of electromagnetic excitation, an end shield centered over a stator carrier emits airborne noise in accor-dance with its structure and centering and/or excites the motor housing and surrounding structural components to exhibit undesirable vibration behavior.

The investigations carried out by the applicant were also able to show that a reduction in this undesirable vibration behavior can be observed when using an adapted centering of the end shield and stator carrier.

Therefore, according to the disclosure, an electric machine with an end shield is proposed, which has a corresponding centering via centering studs with respect to an inner lateral surface of an end shield, whereby a structurally damped vibration behavior can be achieved, so that undesirable acoustic vibrations perceptible in the passenger compartment can be reduced. The centering means described above can be used to achieve a vibration-decoupled design, as the end shield and the stator carrier can move relative to one another at least in the axial and circumferential direction, which contributes to damping the operating vibrations and can significantly improve the acoustic behavior of the electric machine.

Furthermore, centering means can be provided by the centering studs and the inner lateral surface of the stator carrier, which allow for a high degree of coaxiality accuracy at the end shield between the centering studs and the stator carrier, which also contributes to an optimized vibration behavior due to the reduction in vibrations.

The individual elements of the claimed subject matter will be explained first, in the order in which they are named in the claims, and then particularly preferred embodiments of the subject matter disclosed herein will be described.

The electric machine is preferably designed as a rotary machine and can be configured as a radial flux machine or axial flux machine. The electric machine is intended in particular for use within a drive train of a hybrid or fully electrically driven motor vehicle.

In particular, the electric machine is dimensioned such that vehicle speeds of more than 50 km/h, preferably more than 80 km/h and in particular more than 100 km/h can be achieved. The electric machine particularly preferably has an output of more than 30 KW, preferably more than 50 KW and in particular more than 70 kW. Furthermore, it is preferred that the electric machine provides speeds greater than 5,000 rpm, particularly preferably greater than 10,000 rpm, very particularly preferably greater than 12,500 rpm.

The electric machine is preferably designed as a radial flux machine. The stator of a radial flux machine is preferably constructed cylindrically and in particular consists of electrical laminations that are electrically insulated from one another and are constructed in layers and packaged to form laminated cores. Distributed over the circumference, grooves or peripherally closed recesses are preferably embedded into the electrical lamination running parallel to the rotor shaft, and accommodate the stator winding or parts of the stator winding. Depending on the construction towards the surface, the grooves can be closed with closing elements, such as closing wedges or covers or the like, to prevent the stator winding from detaching.

The electric machine according to the disclosure further comprises a rotor. A rotor is the rotating (spinning) part of an electric machine. The rotor preferably comprises a rotor shaft and one or more rotor bodies arranged in a non-rotatable manner on the rotor shaft. The rotor shaft can be hollow, which on the one hand results in weight savings and on the other hand allows the supply of lubricant or coolant to the rotor body.

The gap between the rotor and the stator is referred to as the air gap. In a radial flux machine, this is an annular gap with a radial width that corresponds to the distance between the rotor body and the stator body.

The electric machine can be accommodated in a motor housing. The motor housing encloses the electric machine. A motor housing can also accommodate the control and power electronics. The motor housing can furthermore be part of a cooling system for the electric machine, and can be designed in such a way that cooling fluid can be supplied to the electric machine via the motor housing and/or the heat can be dissipated to the outside via the housing surfaces. In addition, the motor housing protects the electric machine and any electronics that might be present from external influences. A motor housing can be formed in particular from a metallic material. Advantageously, the motor housing can be formed from a cast metal material, such as gray cast iron or cast steel. In principle, it is also conceivable to form the motor housing entirely or partially from a plastic.

The electric machine according to the disclosure comprises at least one end shield. End shields are the rear and front covers of the motor housing that protect the inside of the electric machine against contact, for example, and receive the bearings of the shaft ends of the rotor. They are usually very precisely fitted into the motor housing to ensure that the air gap between the stator and rotor is as uniform as possible. The D end shield designates the output or driven side and usually carries a fixed bearing, the N end shield is the fan side and the bearing arrangement can usually implemented by a sliding fit to compensate for thermal expansion of the rotor.

The D end shield and/or the N end shield can have a one-part or multi-part design, in particular a two-part design. In the case of a two-part end shield design, an inner shield in particular can be arranged radially inside an outer shield. It is particularly preferred that an end shield is formed from a metallic material. In principle, however, it can also be possible for an end shield to be formed from a plastic, in particular a fiber-reinforced plastic.

According to a further preferred embodiment of the subject matter of the invention, the D end shield and/or the N end shield can be mounted in a motor housing of the electric machine.

According to an advantageous embodiment, a substantially annular contact section contacting the end shield and the stator carrier can be formed radially above the annular opening and the end shield and the stator carrier can be positioned radially above the contact section with a clearance in relation to one another. The advantage of this embodiment is that it further improves the acoustic behavior of the electric machine due to the clearance decoupling vibration-prone regions of the end shield and stator carrier.

According to a further preferred further development, the stator carrier can be shaped in a pot-like manner, with a cylinder ring section extending substantially in the axial direction, from which the end shield also extends at least in sections along the radial plane which is substantially orthogonal to the axis of rotation of the rotor. This makes it possible to accommodate the electric machine inside the pot-like stator carrier in a particularly easy and safe manner.

Furthermore, according to an equally advantageous embodiment, the centering studs and the inner lateral surface can be configured in such a way that an interference fit is established between them. The advantageous effect of this embodiment is that a possible fit clearance and the resulting possible misalignment of the end shield and stator carrier can be eliminated. The interference fit is only "light" for this purpose, i.e., it is within the range of the expected production-related tolerances. In particular, the interference fit does not fundamentally prevent a certain axial and/or circumferential relative mobility of the end shield with respect to the stator carrier during operation of the electric machine.

According to a further particularly preferred embodiment, the centering means formed by the centering studs and the inner lateral surface for centering the end shield with respect to the stator carrier can be configured in such a way that they transmit substantially no axial forces and/or torques, whereby the acoustic behavior can be further improved by optimizing the decoupling of the two components of end shield and stator carrier.

Furthermore, the disclosure can also be further developed in such a way that the centering studs and/or the inner lateral surface have radii and/or chamfers by which the end shield is guided radially with respect to the stator carrier when the components are joined axially. The advantage of this embodiment is that, for example, the end shield and stator carrier can be pressed together before the actual joining process (riveting, welding, etc.) using a simple press where possible.

In an equally preferred embodiment, the end shield can be fixed in a non-rotatable manner with respect to the stator carrier by means of a form-fit and/or force-fit and/or material bond. In this context, it may also be advantageous to further develop the disclosure in such a way that the end shield is fixed to the stator in a non-rotatable manner by means of rivet connections.

According to a further preferred embodiment of the subject matter disclosed herein, the centering studs can be formed monolithically with the end shield, which is advantageous in terms of manufacturing and costs. In particular, the centering studs can be formed by means of forming processes. In this context, it is particularly preferred that the centering studs are formed from an end shield formed from a sheet metal by means of deep drawing and/or caulking.

Finally, the disclosure can also be advantageously developed in such a way that a radially outer contact section of the centering studs formed with the inner lateral surface of the end shield is machined, whereby the centering accuracy of the end shield with respect to the stator carrier can be further improved. It is therefore also preferable in this context that the inner lateral surface of the end shield is machined.

BRIEF DESCRIPTION OF THE DRAWINGS

The disclosure is explained in more detail below with reference to drawings without limiting the general concept of the disclosure.

In the drawings.

DETAILED DESCRIPTION

Figure 1:
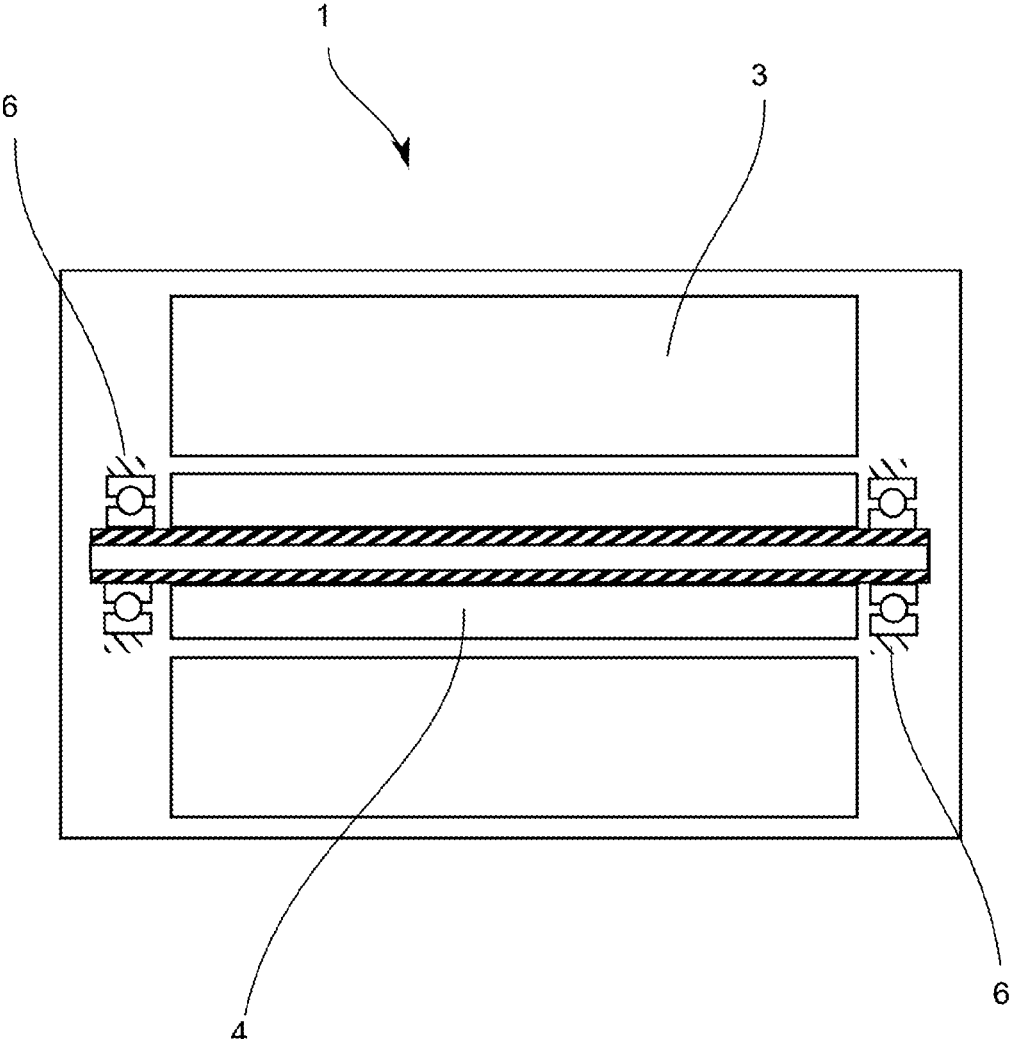
FIG. 1 shows a schematic axial sectional view of an electric machine.
Figure 5:
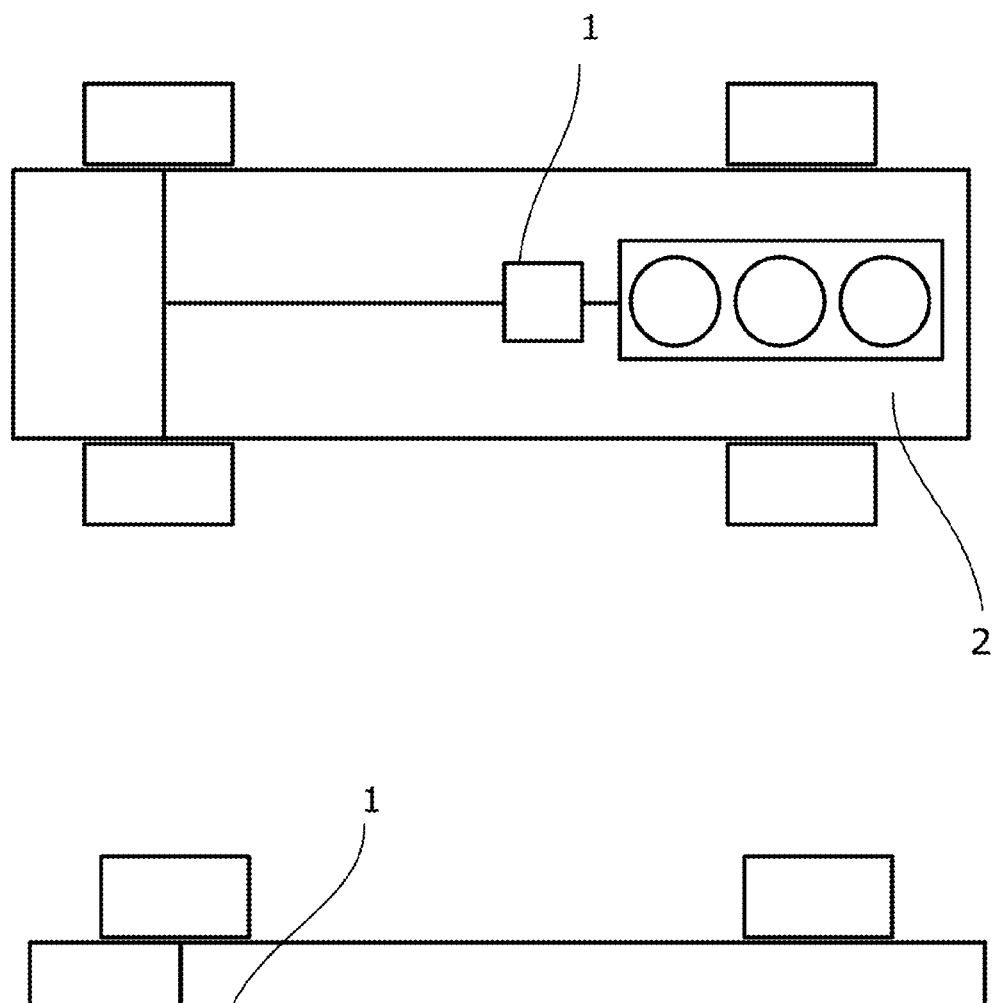
FIG. 5 shows a motor vehicle with a fully electric and a hybrid drive train, each in a schematic block diagram.

FIG. 1 shows an electric machine 1, in particular for use within a drive train of a hybrid or fully electrically driven motor vehicle 2, as also shown by way of example in FIG. 5.

The electric machine 1 comprises a stator 3 and a rotor 4 rotatably arranged in the stator 3. The electric machine 1 also has two end shields 6 arranged in a non-rotatable manner with respect to the stator 3 for mounting the rotor 4 with respect to the stator 3. The configuration of one of the end shields 6 is now explained in more detail below with reference to FIGS. 2-4.

Figure 3:
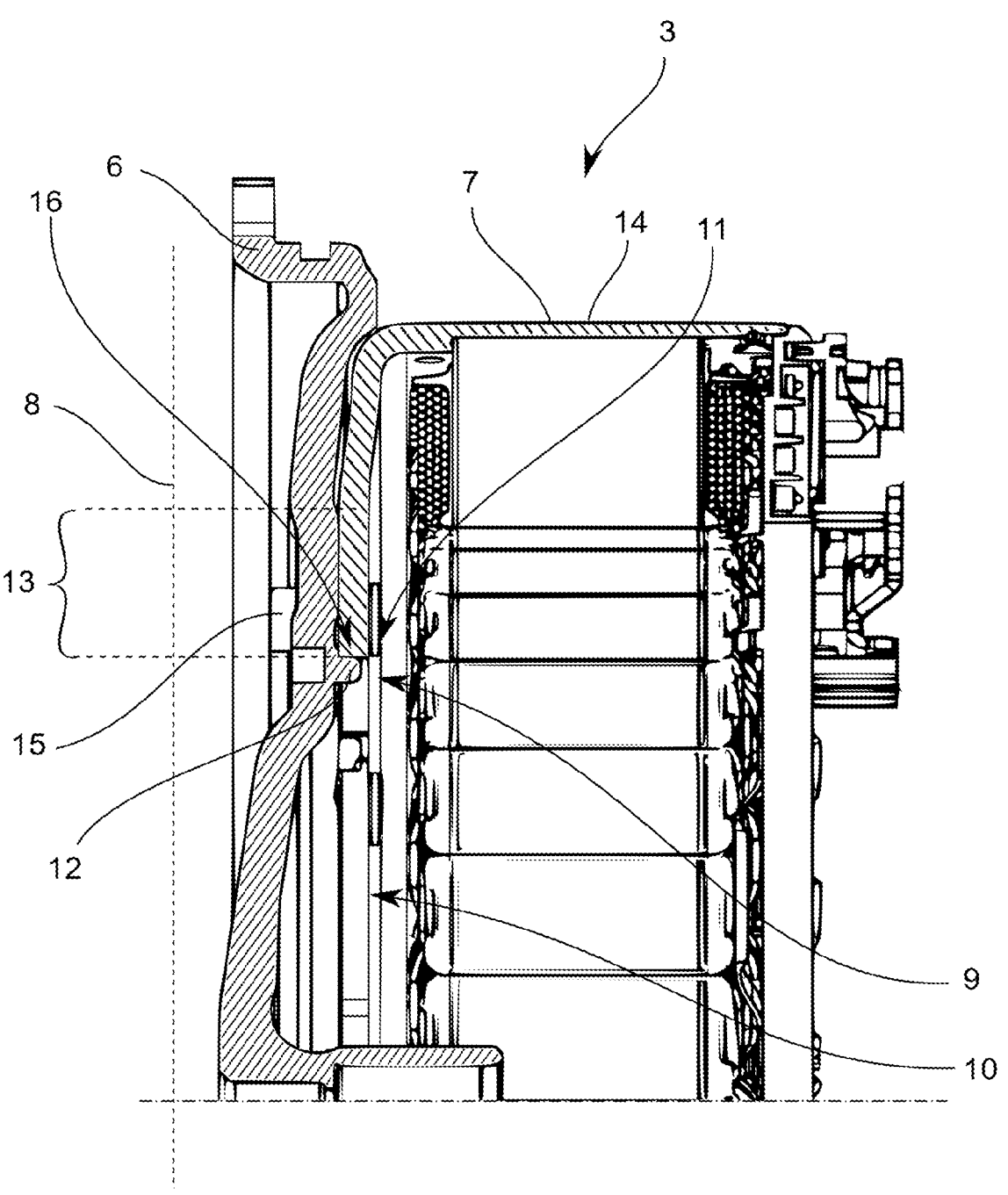
FIG. 3 shows a detailed axial sectional view of a stator and an end shield.
Figure 4:
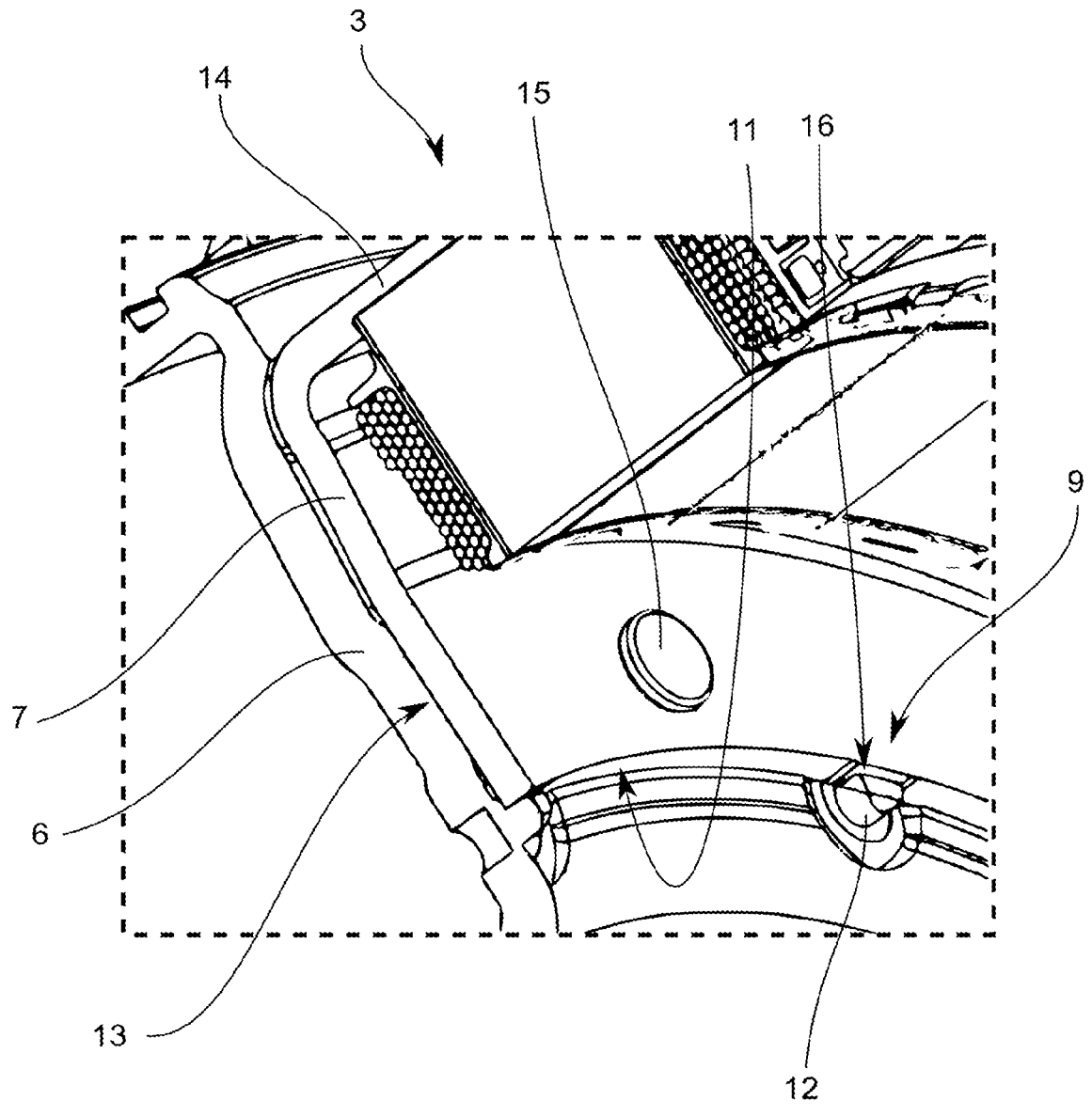
FIG. 4 shows a perspective partial sectional view of a stator and an end shield.

It can be seen from the representation in FIG. 3 that the end shield 6 extends at least in sections along a radial plane 8 which is substantially orthogonal to the axis of rotation of the rotor 4. The stator 3 is connected in a non-rotatable manner to a stator carrier 7 which also extends at least in sections along a radial plane 8 which is substantially orthogonal to the axis of rotation of the rotor 4. The end shield 6 and the stator carrier 7 have centering means 9 for centering the end shield 6 with respect to the stator carrier 7, which are described in more detail below.

Figure 2:
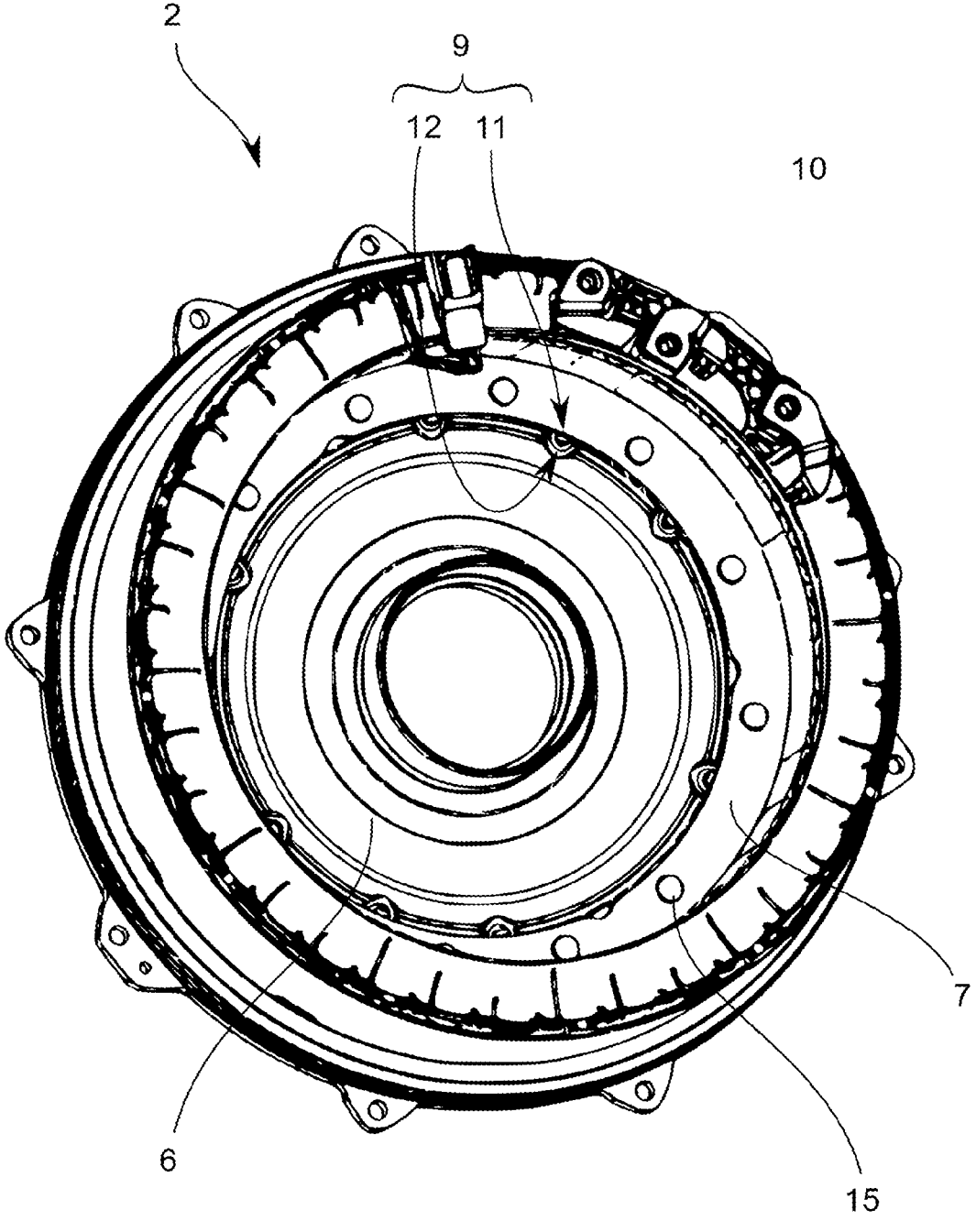
FIG. 2 shows a perspective view of a stator.

The stator carrier 7 has an annular opening 10 on its radial plane 8 which is substantially orthogonal to the axis of rotation of the rotor 4, having a radially inner lateral surface 11 formed as a centering seat. Against this, at least three centering studs 12 projecting axially from the radial plane 8 of the end shield 6, which is substantially orthogonal to the axis of rotation of the rotor 4, bear. These are configured in such a way that the centering studs 12 form the centering means 9 for centering the end shield 6 with respect to the stator carrier 7 with the inner lateral surface 11. This also becomes evident from the synopsis of FIGS. 2-4. FIG. 2 in particular clearly shows that the centering studs 12 are arranged equidistantly on a circle coaxial to the axis of rotation of the rotor of the electric machine 1.

The centering studs 12 and the inner lateral surface 11 are configured in such a way that a slight interference fit is established between them. The centering means 9 formed by the centering studs 12 and the inner lateral surface 11 for centering the end shield 6 with respect to the stator carrier 7 are configured in such a way that they transmit substantially no axial forces and/or torques.

A substantially annular contact section 13 contacting the end shield 6 and the stator carrier 7 is formed radially above the annular opening 10. This contact section 13 is penetrated by a plurality of rivet connections 15, which fasten the stator carrier 7 to the end shield 6. The rivet connections 15 are also arranged equidistantly on a circle coaxial to the axis of rotation of the rotor. Radially above the contact section 13, the end shield 6 and the stator carrier 7 are positioned with a clearance in relation to one another, which is particularly evident from FIGS. 3-4.

The stator carrier 7 is shaped in a pot-like manner, with a cylinder ring section 14 extending substantially in the axial direction, from which the end shield 6 also extends at least in sections along the radial plane 8 which is substantially orthogonal to the axis of rotation of the rotor 4.

The centering studs 12 and/or the inner lateral surface 11 can have radii and/or chamfers by which the end shield 6 is guided radially with respect to the stator carrier 7 when the components are joined axially.

In the exemplary embodiment shown, the centering studs 12 are formed monolithically with the end shield 6. In this regard, the radially outer contact section 16 of the centering studs 12 formed with the inner lateral surface 11 of the end shield 6 is machined and rests against the machined inner lateral surface 11 of the end shield 6, whereby a high degree of coaxiality accuracy can be provided.

The disclosure is not limited to the embodiments shown in the figures. The above description is therefore not to be regarded as limiting, but rather as illustrative. The following claims are to be understood as meaning that a stated feature is present in at least one embodiment according to the disclosure. This does not exclude the presence of further features. Where the claims and the above description define 'first' and 'second' features, this designation serves to distinguish between two features of the same type without defining an order of precedence.

LIST OF REFERENCE SIGNS

1 Electric machine
2 Motor vehicle
3 Stator

4 Rotor
6 End shield
7 Stator carrier
8 Radial plane
9 Centering means
10 Opening
11 Lateral surface
12 Centering studs
13 Contact section
14 Cylinder ring section
15 Rivet connections
16 Contact section

The invention claimed is:

1. An electric machine, comprising:
a stator;
a rotor arranged rotatably in the stator;
an end shield arranged in a non-rotatable manner with respect to the stator for mounting the rotor with respect to the stator, wherein the end shield extends at least in sections along a radial plane which is substantially orthogonal to an axis of rotation of the rotor;
the stator is connected in a non-rotatable manner to a stator carrier which extends at least in sections along a radial plane which is substantially orthogonal to the axis of rotation of the rotor;
the end shield and the stator carrier include a centering arrangement for centering the end shield with respect to the stator carrier, via the stator carrier including an annular opening on the radial plane which is substantially orthogonal to the axis of rotation of the rotor, which has a radially inner lateral surface formed as a centering seat, and at least three centering studs projecting axially from the radial plane of the end shield, which is substantially orthogonal to the axis of rotation of the rotor, that bear against the radially inner lateral surface and are configured for centering the end shield with respect to the stator carrier with the inner lateral surface.

2. The electric machine according to claim 1, wherein a substantially annular contact section contacting the end shield and the stator carrier is formed radially above the annular opening, and the end shield and the stator carrier are positioned radially above the contact section with a clearance in relation to one another.

3. The electric machine according to claim 1, wherein the stator carrier has a pot-shape, with a cylinder ring section extending substantially in the axial direction, from which the end shield also extends at least in sections along the radial plane which is substantially orthogonal to the axis of rotation of the rotor.

4. The electric machine according to claim 1, wherein the centering studs and the inner lateral surface are configured such that an interference fit is established between them.

5. The electric machine according to claim 1, wherein any the centering arrangement formed by the centering studs and the inner lateral surface for centering the end shield with respect to the stator carrier is configured to transmit substantially no axial forces and/or torques.

6. The electric machine according to claim 1, wherein at least one of the centering studs or the inner lateral surface have radii and/or chamfers by which the end shield is guided radially with respect to the stator carrier as the components are joined axially.

7. The electric machine according to claim 1, wherein the end shield is non-rotatably fixed with respect to the stator carrier by at least one of a form-fit, a force-fit, or a material bond.

8. The electric machine according to claim 1, wherein the end shield is non-rotatably fixed to the stator by rivet connections.

9. The electric machine according to claim 1, wherein the centering studs are formed monolithically with the end shield.

10. The electric machine according to claim 1, wherein a radially outer contact section of the centering studs formed with the inner lateral surface of the end shield is a machined section.

11. The electric machine according to claim 1, wherein the inner lateral surface of the end shield is a machined surface.

12. An electric machine, comprising:
a stator;
a rotor arranged rotatably in the stator;
an end shield arranged for mounting the rotor with respect to the stator, wherein the end shield extends at least in sections along a radial plane with respect to an axis of rotation of the rotor;
the stator is connected in a non-rotatable manner to a stator carrier which extends at least in sections along a radial plane with respect to the axis of rotation of the rotor;
the end shield and the stator carrier include a centering arrangement for centering the end shield with respect to the stator carrier, the centering arrangement includes the stator carrier having an annular opening on the radial plane relative to the axis of rotation of the rotor, which has a radially inner lateral surface formed as a centering seat, and at least three centering studs projecting axially from the radial plane of the end shield that bear against the radially inner lateral surface to center the end shield with respect to the stator carrier.

13. The electric machine according to claim 12, wherein a substantially annular contact section contacting the end shield and the stator carrier is formed radially above the annular opening, and the end shield and the stator carrier are positioned radially above the contact section with a clearance in relation to one another.

14. The electric machine according to claim 12, wherein the stator carrier includes a cylinder ring section extending substantially in the axial direction, from which the end shield also extends at least in sections along the radial plane.

15. The electric machine according to claim 12, wherein the centering studs and the inner lateral surface are configured such that an interference fit is established between them.

16. The electric machine according to claim 12, wherein at least one of the centering studs or the inner lateral surface have radii and/or chamfers by which the end shield is guided radially with respect to the stator carrier as the components are joined axially.

17. The electric machine according to claim 12, wherein the end shield is non-rotatably fixed with respect to the stator carrier by at least one of a form-fit, a force-fit, or a material bond.

18. The electric machine according to claim 12, wherein the centering studs are formed monolithically with the end shield.

19. The electric machine according to claim 12, wherein a radially outer contact section of the centering studs formed with the inner lateral surface of the end shield is a machined section.

20. The electric machine according to claim 12, wherein the inner lateral surface of the end shield is a machined surface.

* * * * *